United States Patent
Dice et al.

(10) Patent No.: US 7,496,918 B1
(45) Date of Patent: Feb. 24, 2009

(54) SYSTEM AND METHODS FOR DEADLOCK DETECTION

(75) Inventors: David Dice, Foxborough, MA (US); Mandy L. Chung, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 988 days.

(21) Appl. No.: 10/857,811

(22) Filed: Jun. 1, 2004

(51) Int. Cl.
*G06F 9/46* (2006.01)
*G06F 15/173* (2006.01)

(52) U.S. Cl. .................. 718/100; 718/102; 718/104; 709/225

(58) Field of Classification Search .............. 718/104, 718/107, 100, 102; 709/225; 711/100; 707/10
See application file for complete search history.

(56) References Cited

U.S. PATENT DOCUMENTS

| | | | | |
|---|---|---|---|---|
| 5,524,247 | A * | 6/1996 | Mizuno ...................... | 710/200 |
| 5,590,335 | A * | 12/1996 | Dubourreau et al. ........ | 718/104 |
| 6,173,308 | B1 * | 1/2001 | Hilditch et al. ............. | 718/106 |
| 6,593,940 | B1 * | 7/2003 | Petersen et al. ............. | 715/700 |
| 6,598,068 | B1 * | 7/2003 | Clark ......................... | 718/104 |
| 6,622,155 | B1 * | 9/2003 | Haddon et al. .............. | 718/100 |
| 6,711,739 | B1 * | 3/2004 | Kutcher ...................... | 718/1 |
| 6,715,146 | B1 * | 3/2004 | Simmons et al. ............ | 718/104 |
| 6,721,775 | B1 * | 4/2004 | Fagen et al. ................. | 718/100 |
| 2003/0023656 | A1 * | 1/2003 | Hutchinson et al. ......... | 709/100 |
| 2003/0069920 | A1 * | 4/2003 | Melvin et al. ............... | 709/108 |
| 2004/0025164 | A1 * | 2/2004 | Ma et al. .................... | 718/107 |
| 2005/0028157 | A1 * | 2/2005 | Betancourt et al. .......... | 718/100 |

OTHER PUBLICATIONS

IBM, "Deadlock detection using only thread identifiers", 1996, IBM, vol. 39, No. 1, pp. 1-3.*
IBM, "Improved solution to the mutual excusion problem", 1984, IBM, vol. 27, No. 2, pp. 1-3.*

* cited by examiner

*Primary Examiner*—Meng-Ai An
*Assistant Examiner*—Caroline Arcos
(74) *Attorney, Agent, or Firm*—Brooks Kushman P.C.

(57) ABSTRACT

A lightweight, concurrent detection mechanism avoids global thread suspension by operating during runtime with threads under examination. A particular configuration combines a dependency ("waits for") snapshot with a progression check to determine advancement of purportedly deadlocked threads. Thread blocking is enumerated in a table or graph which denotes dependencies of threads and the corresponding resources. For identified circular dependencies, a successive transition, or progression check ratifies the potential deadlock. A transition counter corresponding to each thread is analyzed in the progression check. The transition counter is indicative of a change in state for the process in question, hence is indicative of instruction execution, an activity not performed by a blocked process. Deadlock is therefore ratified if the transition counters associated with the threads in the potential deadlock have not advanced.

12 Claims, 6 Drawing Sheets

SYSTEM AND METHODS FOR DEADLOCK DETECTION

BACKGROUND

Conventional computer systems typically share resources, such as disk drives and communication ports, for example. For a shared resource, a conventional queuing or scheduling mechanism allocates the resources to requesters, such as processes or threads, of the shared resource. In a conventional multiprocessing or multiprogramming system, there may be many requestors potentially competing for the same shared resource. Often, a requestor must wait for availability of a shared resource before continuing execution. Accordingly, efficient allocation of shared resources to requestors is desirable in such a computer system.

In a multiprocessor computer system, there are typically multiple processing devices that are each capable of executing sequences of instructions, called threads, concurrently with other processing devices. The individual processing devices in a conventional multiprocessing computer system may be separate microprocessor chips interconnected via a data bus or other circuitry, or the processing devices may reside as respective "cores" (e.g., processing circuits) on a single "die" (i.e., one physical microchip). If each respective processing device is a separate physical chip, each chip may include instruction processing circuitry as well as an on-board memory or local cache and an associated cache controller. Examples of multiprocessing computer systems are workstations manufactured by Sun Microsystems of Palo Alto, Calif., USA that can contain as many as 256 Scalable Processor Architecture (SPARC) processors. An example of a multiprocessing computer chip containing multiple processing cores on a single processor die that share a common cache is the Intel Pentium-4 line of microprocessors containing Hyper-Threading technology. Pentium-4 and Hyper-Threading are registered U.S. trademarks of Intel Corporation.

Such conventional computer systems, therefore, typically execute a number of concurrent threads. A thread may execute on one processing device for one period of time until thread preemption occurs. When the kernel schedules that thread for execution again, the kernel may execute that thread on different processing device than the original processing device that formerly executed that thread. This is called thread migration. Thread migration may happen, for example, if at the time of scheduling the thread for re-execution, the original processing device is now busy executing another thread but the different processing device is now available for execution of a thread.

The conventional threads, therefore, perform tasks as defined by the sequence of instructions in the thread. By executing and preempting the threads according to a scheduling mechanism or algorithm, the kernel ensures that each of the concurrent threads receives an appropriate amount of execution time. The cycles of execution and preemption are typically referred to as scheduling, and such cycles strive to maximize the use of the processing device by ensuring that each thread does not remain idle.

Accordingly, the scheduling typically attempts to provide an optimal period, sometimes referred to as a "slice" or "quantum" of processor resources, to each thread in a rotating manner. When an optimal period of execution time has occurred, the scheduler performs a context switch to suspend execution of the current thread and provide execution (processor) resources to another thread. One rudimentary scheduling algorithm simply allocates a fixed time "slice" to each thread, and performs a context switch when the time slice elapses. Typically, a system scheduler permits a thread to run on a processor until (a) its quantum is exhausted and the thread is preempted, permitting some other eligible thread to run, (b) an interrupt makes a higher priority thread ready, preempting the thread, or (c) the thread voluntarily blocks. It should be noted that (a) and (b) above are both cases of preemption—the thread is involuntarily descheduled (removed from the processor). When a thread is preempted it remains eligible to run. Scenario (c) is voluntary, and typically involves locks, waiting for IO, etc. In the case of (c) the thread doesn't remain eligible to run. Some other action, such as the IO completing, or some other thread releasing a lock, must occur, at which time the previously blocked thread is again made eligible to run. In general, therefore, schedulers identify, for example, when a thread has attained a convenient point in processing. One example of such a convenient point is a waiting or polling operation for a shared resource, such as a storage device or transmission gateway.

Therefore, conventional scheduling algorithms typically identify when a thread is waiting for a mutual exclusion lock held by another thread with respect to a shared resource to be released, resulting in a so called "blocked" thread. Since a blocked thread cannot perform further processing until it attains the blocking resource (i.e. when the current owner performs a disk write, for example), such a point denotes an optimal time at which to deschedule the thread and perform a context switch to a thread which is ready to continue processing. Therefore, conventional threads may execute until attaining a point at which the thread requires a resource which is not immediately available, waiting for such a mutual exclusion lock on a shared resource, at which point the thread becomes blocked pending availability of the resource. Such requests for a mutual exclusion lock are typically queued and addressed according to a FIFO or other queuing manner, thereby permitting the blocked thread to continue upon satisfaction of the shared resource request.

SUMMARY

In a conventional multiprocessing system operable for concurrent execution of multiple threads, such as a Java Virtual Machine (JVM) or other multiprogramming arrangement, the scheduler typically performs rapid context switching among the threads to provide an optimal distribution of processor resources. Further, each of the threads requests and obtains access to shared resources, as the needs of the thread require. The scheduler schedules each thread for a processing time terminating upon occurrence of a particular event, such as an elapsed time interval or a need for a shared resource. When a thread issues a request for a shared resource, such as a disk drive or communications line, for example, the thread becomes blocked (waiting) until the shared resource is available. The scheduler therefore strives to ensure that processing time is neither "wasted" on blocked threads nor are threads "starved" for processing time.

In a conventional multiprogramming system with many threads and shared resources, scheduling becomes complex. Multiple threads waiting on, or "blocked" pending availability of a particular resource, may become enqueued. Individual conventional threads may not adequately be aware of pending requests made by other threads. Accordingly, a so called "circular dependency" may result from threads directly or indirectly depending on the same set of resources. If the threads in a circular dependency make a request for a resource, and accordingly remain blocked for that resource, a deadlock condition may occur in which each blocked thread is waiting for another blocked thread to relinquish a resource, each of which is blocked in the circular manner defined by the dependency.

For example, thread A may be blocked waiting for a disk drive held by thread B. Thread A wants to perform a file copy, and has taken a lock on a communications port (resource), and is now trying to obtain the disk having the file to be copied. Thread B, however, is trying to read a remote file. Thread B has taken a lock on the disk drive, but needs the communications port held by thread A. Accordingly, thread B remains blocked waiting for A to relinquish the lock on the communications port, while A will not release the lock until it obtains the disk drive held by B. Therefore, thread A is blocked on a resource (disk drive) held by B, and B is simultaneously blocked on a resource (port) held by A. Such a conventional classic deadlock may involve many more threads resulting in a longer circular dependency chain, however the deadlock implications occur when the blocking dependencies circle back.

Configurations of the invention are based, in part, on the observation that conventional deadlock detection tends to be computationally intrusive and cumbersome, impacting many threads which may or may not be in such a circular dependency arrangement. Particular conventional approaches may involve identifying shared resources and competing processes to denote dependencies of threads and the corresponding resources for which they are blocked (i.e. waiting for).

One particular conventional approach involves an ad-hoc or "on-the-fly" analysis, in which each thread is scanned to determine if the thread is involved in a deadlock. Such "on-the-fly" detectors may provide immediate deadlock detection, however involve a cumbersome scan iterating over a potentially lengthy list of threads and objects. In a worst-case scenario, the length of the thread list is bounded only by the number of threads in the system. Also, the on-the-fly (o-t-f) detector operates each time a thread blocks. The o-t-f detector is, in a sense, "pessimistic" and checks for a cycle each and every time a thread blocks. The disadvantage to an o-t-f detection is the additional overhead. (Deadlock is relatively rare, so the deadlock detection scans at block-time are both frequent and usually fruitless). An advantage to o-t-f is that a deadlock is detected immediately, as it happens. Further, such "on-the-fly" detectors impose additional synchronization to ensure that the detection operation does not leave the system in an inconsistent state. Such additional synchronization represents potentially adverse performance.

Other approaches employ an offline approach in which an external agent periodically scans the JVM threads for any instances of deadlock. Conventional offline approaches invoke a so-called "stop the world" implementation in which all threads in the JVM stop at known points before the deadlock scan may commence. Threads may not execute during the deadlock detection phase, thus degrading overall throughput. Further, the detection phase is typically serial (only a single CPU), thus restricting parallelism.

The invention as defined by the present claims substantially overcomes the above indicated shortcomings of conventional deadlock detection by providing a lightweight, concurrent detection mechanism which avoids global thread suspension (e.g. "stop the world" approach) and associated performance implications presented by the conventional deadlock detection mechanisms. The mechanism operates in runtime, in parallel with the normal threads and does not suspend threads under analysis, hence it is lightweight.

In a particular arrangement, the exemplary configuration allows threads to continue execution during execution by combining a thread dependency enumeration, or snapshot, with a progression check to determine advancement of purportedly deadlocked threads. Such a snapshot identifies threads which are blocked by locks held by other threads. Threads which are waiting for, or blocked because of locks owned, or held, by other threads are enumerated in a so-called "waits for" graph, which denotes dependencies of threads and the corresponding resources for which they are blocked (i.e. waiting for). A periodic detection check is performed, at which time the dependency, or "waits for" gathering of threads and corresponding resource objects identifies circular dependencies (or cycles, in graphing terminology) and therefore, potential deadlocks. It should be noted that because of race conditions and concurrent execution, an apparent circular dependency detected by the deadlock detector does not necessarily constitute or imply a true deadlock, but rather an apparent circular dependency may ripen into deadlock when the threads therein simultaneously hold locks according to the circular manner.

For identified circular dependencies, a successive transition, or progression check ratifies or negates the potential deadlock. A transition counter corresponding to each thread is analyzed in the progression check. The transition counter is indicative of a change in state for the process in question, hence is indicative of advancement of an instruction (program) counter executing instructions, an activity not performed by a blocked process. Deadlock is therefore ratified if the transition counters associated with the potential deadlock of the circular dependency have in fact not advanced. In this manner, a multiple phase approach employs successive passes to analyze both dependency cycles indicative of potential deadlock and state transition, or progression analysis to ratify and confirm actual deadlock.

In further detail, in a particular exemplary configuration, the deadlock detection mechanism is employable for controlling execution in an object based environment by identifying a plurality of threads hating a potential demand for a shared resource, and determining when multiple identified threads are waiting for at least one of the shared resources. A deadlock detector enumerates, for each of the determined waiting threads, a lock holding entity holding the lock on the shared resource sought by each of the waiting threads, such as via a tuple stored in a thread table. The deadlock detector computes whether an undesirable, or circular, dependency exists by analyzing each of the blocking entities and corresponding waiting threads. A transition comparator compares, if the analyzing indicates that an undesirable dependency exists, a progression indicator indicative of advancement of the threads corresponding to the undesirable dependency to ratify the potential deadlock indicated by the circular dependency.

To compute the undesirable dependency, the deadlock detector determines a circular dependency among a plurality of waiting threads, in which the circular dependency is indicative of a thread waiting for a resource held by a lock holding entity and simultaneously holding a resource sought, directly or indirectly, by the same lock holding entity, thus creating a circular dependence. Further, computation of the circular dependency and comparing of the progression indicator occur in a nonintrusive manner during continuous concurrent execution of the threads, thus not interrupting thread execution.

In order to enumerate the dependencies for assessing circular dependence, the deadlock detector builds a blocking information tuple indicative of an instance of a thread waiting for a resource, and aggregates a plurality of blocking information tuples indicative of a plurality of threads and corresponding blocking entities. Following the enumeration, comparing further comprises ratifying a potential deadlock presented by the pending undesirable dependency, in which a lack of advancement by a potentially deadlocked thread ratifies, or confirms, the potential deadlock. Ratifying the existence of a deadlock includes identifying progression (or nonprogression) of the threads in question by performing a successive snapshot to identify advancement of the threads encompassed in the circular dependency (dependency cycle, as indicated in a waits-for graph).

Computation of advancement is indicated by a state transition of at least one of the threads in the computed potential dependency cycle. Therefore, determining advancement includes reading a transition register indicative of advancement of a progress indicator, such as an instruction counter, instruction pointer, or other indication of execution advancement in the thread, in which the instruction counter advances according to a thread control flow when the thread is unblocked (e.g. executing), and is stopped when the thread is waiting for a resource.

In a specific exemplary configuration, discussed further below, the method for detecting deadlock between concurrent threads in a multiprogramming environment includes periodically polling a plurality of threads having a potential demand for the same shared resource or set of resources, in which the threads are operable to alternate ownership of the shared resources, polling occurring in a nonintrusive manner. The agent interface gathers a snapshot of ownership of shared resources by aggregating a set of tuples, in which each tuple is indicative of ownership of a shared resource by a thread. The deadlock detector periodically utilizes the agent interface to retrieve status messages indicative of the tuples including the thread blocking status and state transitions contained therein. The agent then scans, in a first transition check, a state indicator corresponding to the first and second threads, in which the state indicator is indicative of a current processing state of the first and second threads. The first state indicator is employed for deadlock ratification if a circular dependency is indicated. The deadlock detector determines, from the set of tuples, when a first thread is blocked waiting for a shared resource owned by the second thread, and further determines that the second thread is waiting for a shared resources owned to the first thread, thus denoting a circular dependency. Note that the circular dependency may involve other threads as well. Following identification of a circular dependency, ratification of the potential deadlock involves scanning, in a second transition check, the state indicator corresponding to the first and second threads in which the scanning is operable to determine a delta state transition. The deadlock detector concludes, if the second transition check is indicative of a lack of state transition in both the first thread and the second thread, that a deadlock state exists because neither thread is advancing (i.e. executing instructions), as indicated by the lack of a state change in either.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or Field Programmable Gate Array (FPGA). The software or firmware or other such configurations can be installed onto the computerized device (e.g., during operating system for execution environment installation) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, and computer program products and/or software applications such as operating system's and execution environments such as the Java Virtual Machine manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

The exemplary arrangements of the invention disclosed herein are based, in part, on the observation that conventional deadlock detection tends to be computationally intrusive and cumbersome, impacting many threads which may or may not be in a circular dependency. The above-described conventional "on-the-fly" detectors may provide immediate deadlock detection, however involve a cumbersome scan iterating over a potentially lengthy list of threads and objects. The "stop the world" implementation requires that all threads in the JVM stop at known points before the deadlock scan may commence. Such particular conventional approaches typically involve exhaustively identifying all shared resources and competing processes to denote dependencies of threads and the corresponding resources for which they are blocked (i.e. waiting for).

The invention as defined by the present claims substantially overcomes the above indicated shortcomings of conventional deadlock detection by providing a lightweight, concurrent detection mechanism which avoids global thread suspension (e.g. "stop the world" approach) and associated performance implications presented by the conventional deadlock detection mechanisms. Embodiments of the invention provide mechanisms and techniques which operate during runtime with the threads under examination, and which do not terminate or suspend threads under analysis, hence providing a lightweight implementation. In a particular arrangement, the exemplary configuration allows threads to continue execution during execution by combining a dependency ("waits for") snapshot with a progression check to determine advancement of purportedly deadlocked threads.

Threads which are holding locks for resources waited on by other threads are enumerated in a so-called "waits for" graph, which denotes dependencies of threads and the corresponding resources for which they are blocked (i.e. waiting for). A periodic detection check is performed, at which time a dependency, or "waits for" graphing of threads and corresponding resource objects identifies circular dependencies (or cycles, in graphing terminology) and therefore, potential deadlocks. It should be noted that a circular dependency is not a deadlock in and of itself, but ripens into deadlock when the threads therein simultaneously hold locks according to the circular manner.

Figure 1:
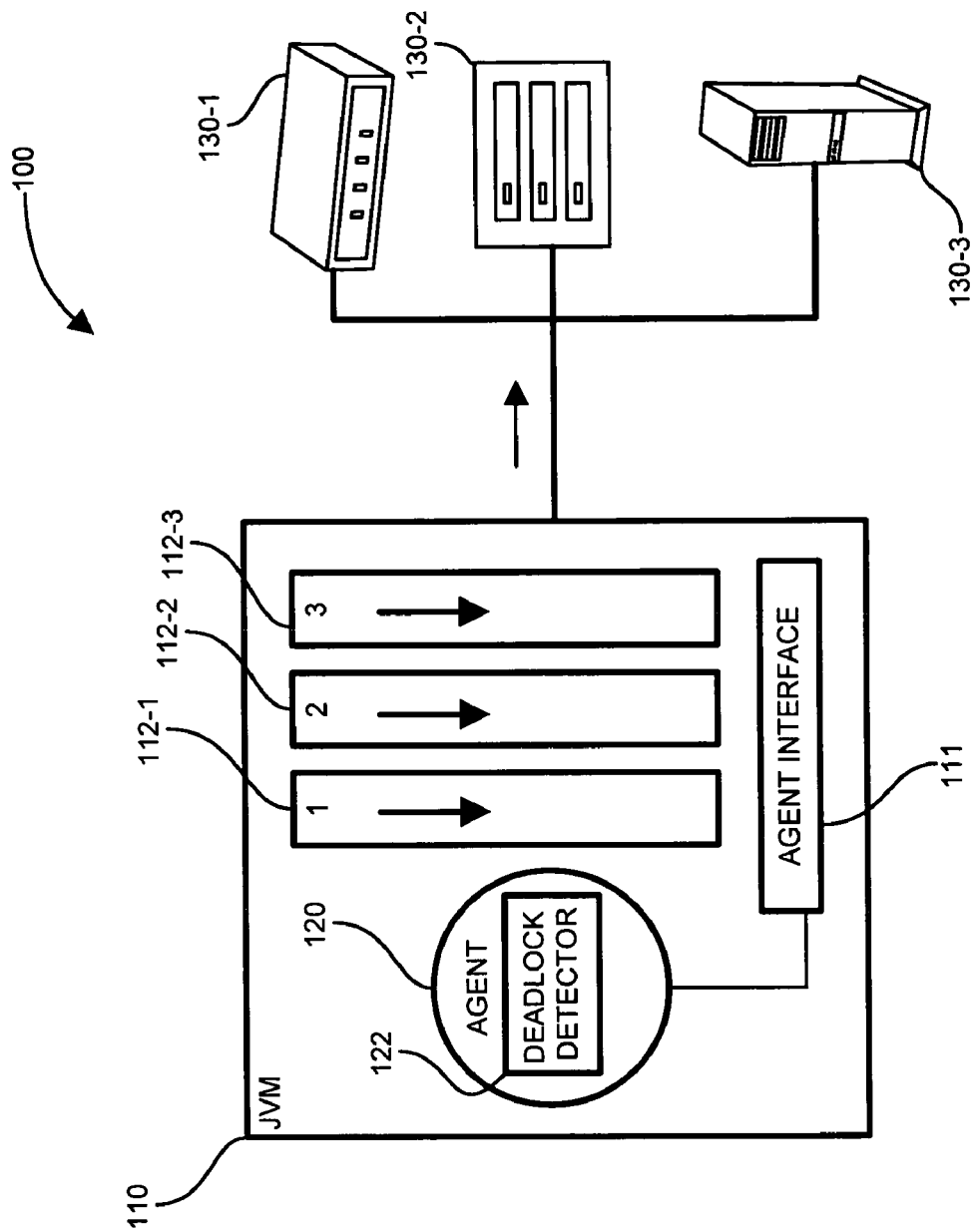
FIG. 1 is context diagram of an agent in a computer system suitable for use with the present invention.

FIG. 1 is context diagram of an agent 120 in a computer system 110 suitable for use with the present invention. Referring to FIG. 1, a computing environment 100 includes a computing system such as a Java Virtual Machine (JVM) 110. The JVM 110 executes one or more threads 112-1 . . . 112-3 (112 generally), each operable to access shared resources 130, such as connectivity device 130-1, disk array 130-2 and server 130-3. Other shared resources 130 may be invoked as the requirements of the computing system 110 indicate. The agent 120 couples to each of the threads 112-1 . . . 112-3 (112 generally) via an agent interface 111, operable to identify resources 130 owned or held, locks waited upon, and progress of execution. A deadlock detector 122 in the agent 120, employed during deadlock detection operations, accesses the agent interface 111 for determining deadlock according to principles of the invention.

Figure 2:
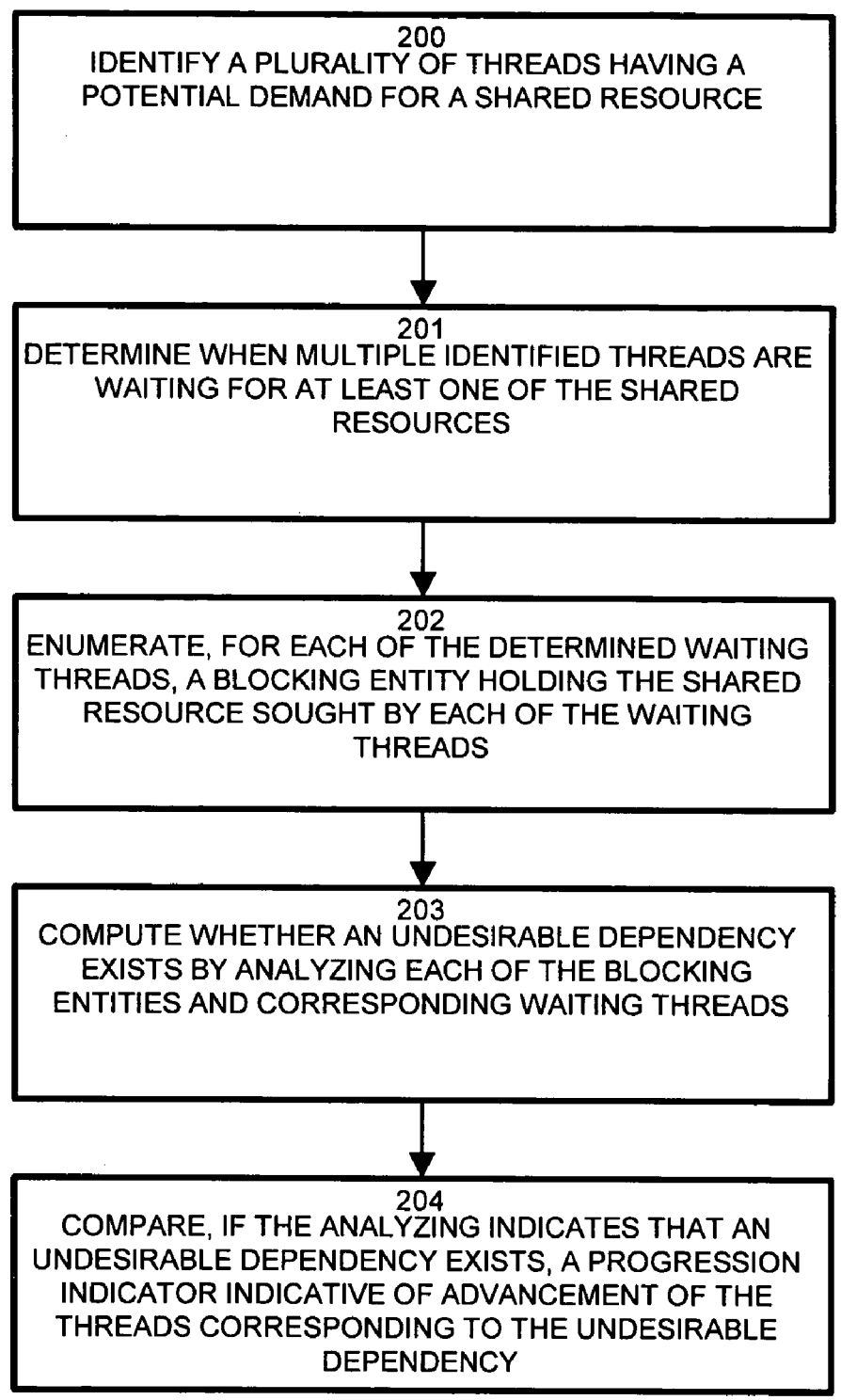
FIG. 2 is a flowchart of agent operation in the computer system of FIG. 1.
Figure 3:
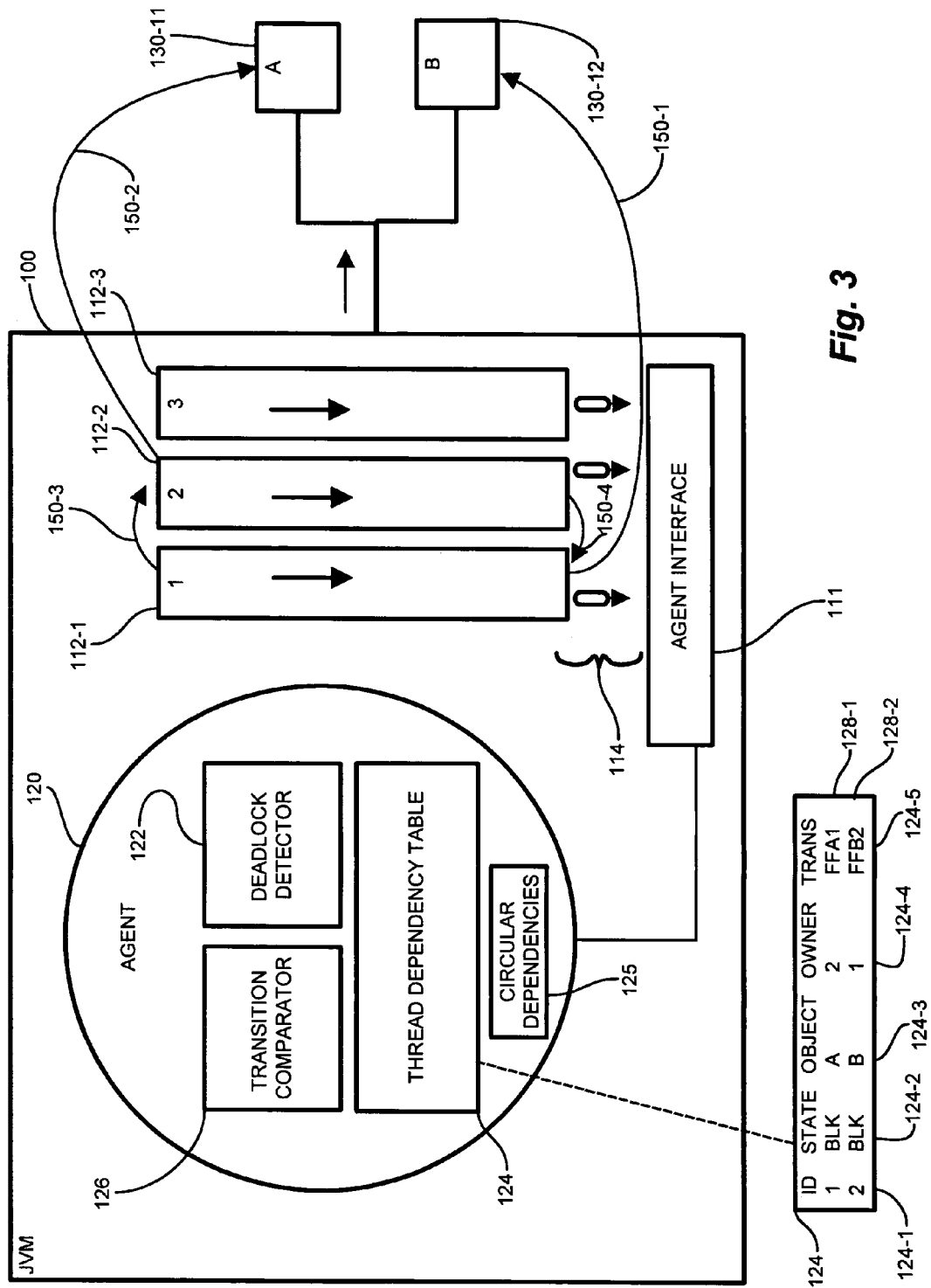
FIG. 3 shows the agent of FIG. 1 in greater detail performing deadlock detection as defined herein.

FIG. 2 is a flowchart of agent 120 operation in the computer system 110 of FIG. 1, shown in greater detail in FIG. 3. Referring to FIGS. 1-3, the method for controlling execution via deadlock detection in an object based environment 100 includes identifying a plurality of threads 112-N, each having a potential demand for a shared resource 130, as depicted at step 200. The deadlock detector 122 determines when multiple identified threads 112 are waiting for at least one of the shared resources 130-N (130 generally), as shown at step 201. The deadlock detector 122 may operate according to a periodic window, scanning for circular dependencies at regular intervals, or may examine other conditions such as queue depth and/or wait times exhibited by the threads 112 waiting for a resource 130.

Upon expiration of such an interval, the deadlock detector 122 enumerates, for each of the determined waiting threads 112, a lock holding entity (thread) 112 holding the shared resource 130 sought by each of the waiting threads 112, as disclosed at step 202. Accordingly, the deadlock detector 122 builds a thread dependency table 124 (dependency table) including entries 128-N for each thread 112 currently holding a lock on a shared resource 130 to identify current dependencies (FIG. 3, below). Alternatively, the dependency table 124 may be in the form of a "waits for" graph, as discussed above. From the enumerated entries in the thread table 124, the deadlock detector 122 computes whether a circular dependency exists by analyzing each of the blocking entities and corresponding waiting threads 112, as depicted at step 203. The deadlock detector 122 traverses the thread table 124 and, for each blocked thread 112 waiting for a resource, as indicated by the state field 124-2, examines the owner thread of that resource 130, indicated by owner field 124-4. The deadlock detector then determines if the owner thread 124-4 is also blocked waiting for a resource 130, by traversing the thread table 124 for a matching value in the ID field 124-1. If the deadlock detector 122 finds an owner 124-4 of a resource 130 is also directly or indirectly blocked by another thread 112, waiting for that resource as indicated in the dependency table 124, then a circular dependency exists. The deadlock detector 122, therefore, computes a dependency chain, or "waits for" graph, illustrating the chain of dependencies among multiple threads 112 and resources 130 which may result in a circular dependency.

For the computed circular dependencies 125 identified at step 203, these potential deadlocks are confirmed, or ratified, to determine an actual deadlock. Accordingly, following a brief time lag, such as at the next interval, a transition comparator 126, compares, if the analyzing of the dependency table 124 indicates that an undesirable dependency exists, a transition indicator 124-5 indicative of advancement of the threads 112 corresponding to the undesirable circular dependency 125, as depicted at step 204. The transition indicator 124-5 is the value of a thread specific counter which a thread 112 increments upon each state change. Threads 112 which are actually deadlocked will not exhibit a state change, in contrast to executing threads which execute instructions and therefore exhibit a state change.

As indicated above, since the circular dependency check of step 203 differs from the conventional "stop the world" approach by allowing threads to continue execution during the enumeration of step 202, it is possible that threads indicated as blocked at an earlier time may become unblocked at a later time during the interval of sampling, or sampling window, of the threads in the circular dependency 125. Accordingly, a circular dependency in the dependency table 124 does not necessarily indicate a deadlock unless a simultaneous "snapshot" of current activity is considered. Accordingly, the transition check ratifies a potential deadlock by identifying if threads 112 in the alleged circular dependency 125 (i.e. the earlier sampled thread above) have advanced, and therefore are no longer blocked.

FIG. 3 shows an example of the agent of FIG. 1 in greater detail performing deadlock detection as defined herein. Referring to FIG. 3, the agent 120 further includes a thread table 124 and a transition comparator 126. The thread table 124 includes fields 124-1.124-5, indicative of the state of each of a plurality of threads, indicated by entries 128-1 . . . 128-N. The fields 124-1 . . . 124-5 illustrate an exemplary set of thread and object blocking information employable in an exemplary configuration herein. Alternative arrangements of the thread table may be employed in alternate configurations. Briefly, the exemplary fields include a thread ID 124-1, a state 124-2 of blocked (BLK) or executing (EXE), an object 124-3 (resource) which the process, if blocked, is waiting for, and the current owner 124-4 of the blocking resource, and a transition counter indicative of state transitions due to instruction execution by the thread. Generally, deadlocked threads 112 are not executing additional instructions, hence will not indicate a change in state. The deadlock detector employs the agent interface 111 to retrieve status messages 114 from each of the threads 112 indicative of the status of the thread 112, resources requested, and other information to allow the agent 120 to maintain or construct the thread dependency table 124.

The fields 124-1 . . . 124-5 therefore store information allowing the deadlock detector 122 to first check for a circular dependency 125, by examining the owner 124-4 of blocking objects 124-3 (resources). The exemplary resources include resource A 130-11 and B 130-12, and in a particular arrangement may include substantially more resources, resulting in a more complex circular dependency arrangement. Then, if a circular dependency is found, the transition comparator 126 ratifies the potential deadlock by examining the transitions 124-5 made by the threads 112 in the circular dependency 125.

Figure 4:
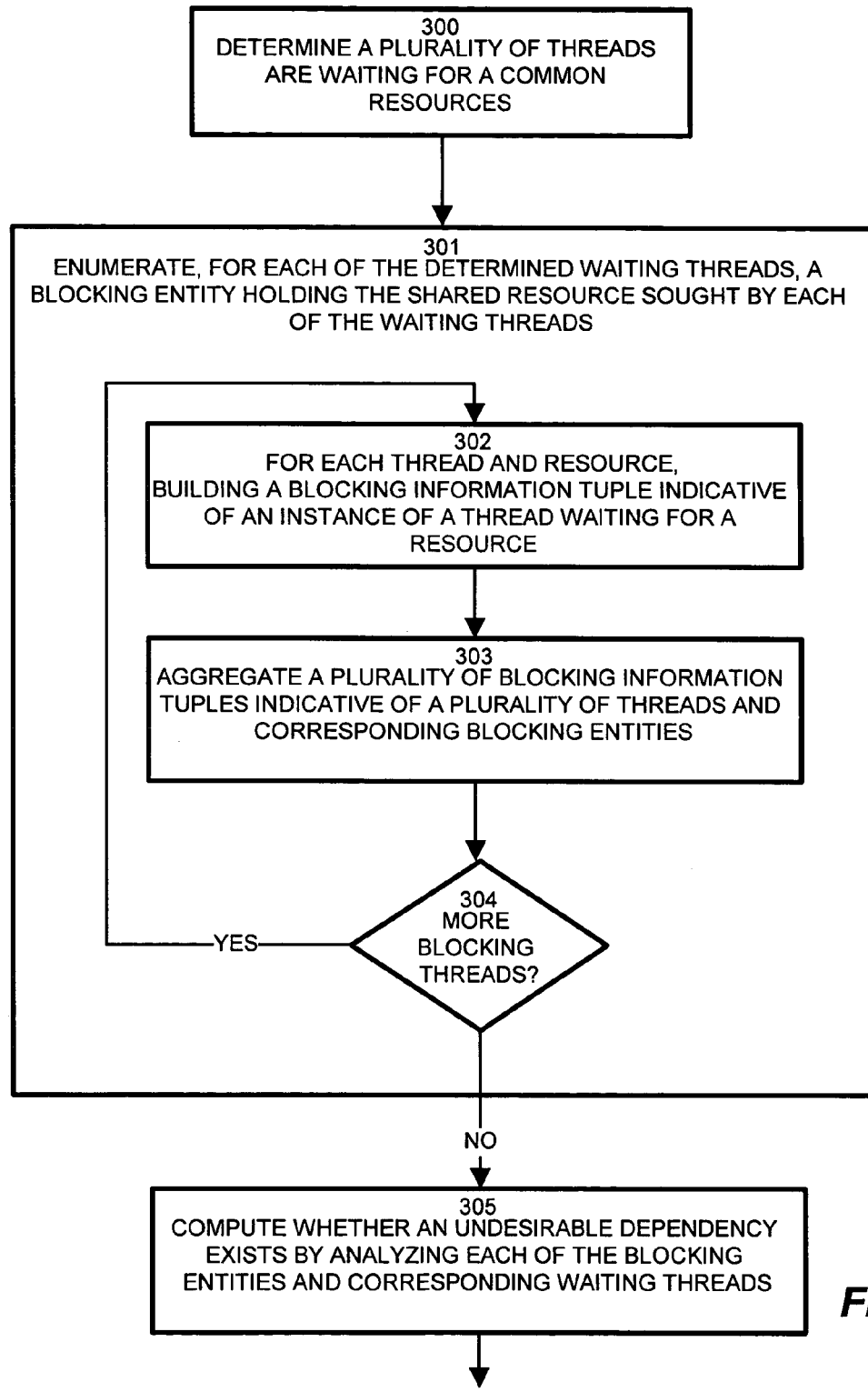
FIGS. 4-6 are a flowchart of deadlock detection by the agent of FIG. 3.
Figure 5:
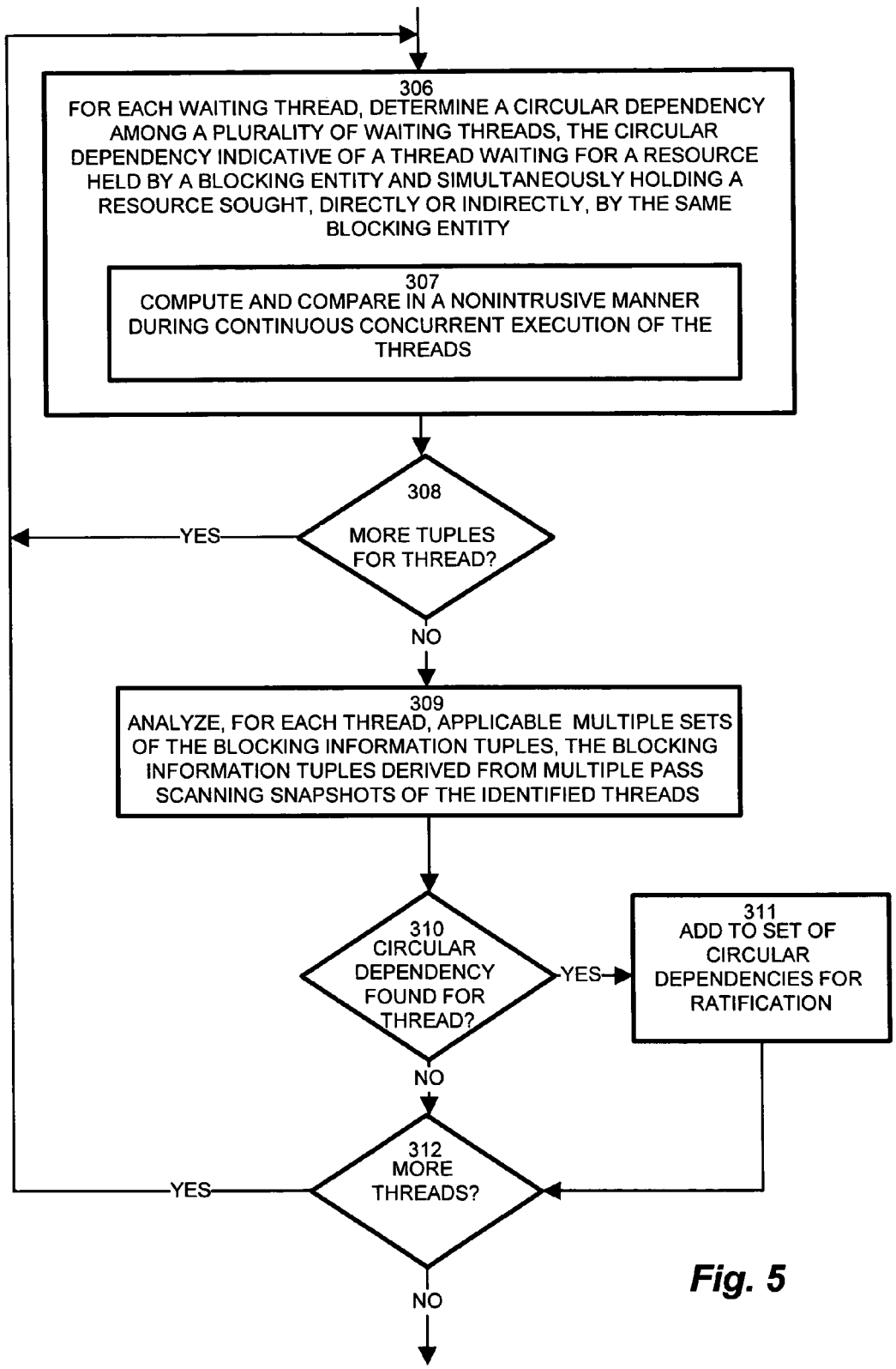
Figure 6:
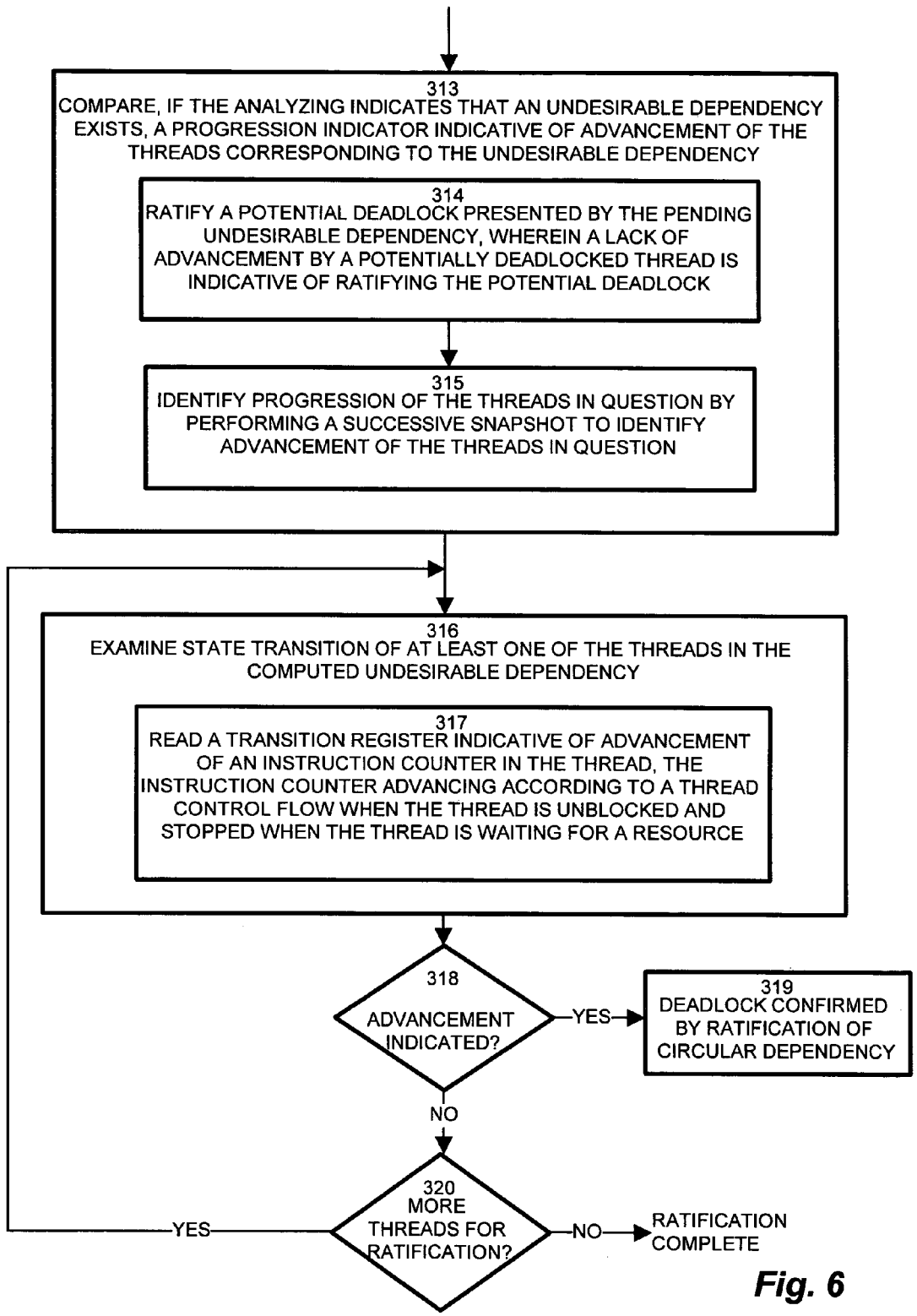

FIGS. 4-6 are a flowchart of deadlock detection by the agent of FIG. 3. Referring to FIGS. 3-6, the deadlock detector 122 determines when multiple identified threads are waiting for at least one of the shared resources, as depicted at step 300 and as disclosed above. The deadlock detector builds the transition table, or equivalent "waits for" structure, by enumerating, for each of the determined waiting threads 112, a lock holding entity holding the shared resource 130 sought by each of the waiting threads, as depicted at step 301. As shown in FIG. 3, two exemplary resources A 130-11 and B 130-12 are available to each of threads 112-1 . . . 112-3.

Such enumerating further comprises building, for each thread 112 waiting for a particular resource, a blocking information tuple indicative of an instance of a thread waiting for a resource, as depicted at step 302. A system monitoring mechanism such as resource daemon (not specifically shown) may be employed to generate the blocking information tuple from a variety of system level queues and locks. The deadlock detector 122 aggregates a plurality of blocking information tuples indicative of a plurality of threads and corresponding blocking entities, as disclosed at step 303, and stores the tuples as entries 128-N (128 generally) in the thread dependency table 124. The deadlock detector 122 analyzes, or scans, blocked threads 112 in an iterative manner to make a complete pass of all potentially blocked threads 112, as depicted by the check at step 304, to complete the thread dependency table 124. The exemplary thread dependency table 124 illustrates that thread 1 (112-1) is blocked waiting for object A, currently owned (held) by thread 2, and that thread 2 (112-2) is blocked waiting for object B, held by thread 1 (112-1).

The deadlock detector 122 employs the completed thread dependency table 124 to compute whether an undesirable (i.e. circular) dependency exists by analyzing each of the blocking entities 112 (threads) and corresponding waiting threads 112, as depicted at step 305. The deadlock detector 122 retrieves or accesses the thread dependency table 124 to computing the existence of an undesirable dependency by determining a circular dependency among a plurality of waiting threads 112, the circular dependency indicative of a thread 112 waiting for a resource 130 held by a lock holding entity, and the thread 112 simultaneously holding a resource 130 sought, directly or indirectly, by the same lock holding entity, as shown at step 306.

Such computing and comparing occur in a nonintrusive manner during continuous concurrent execution of the threads, as depicted at step 307, and typically include analyzing multiple sets of the blocking information tuples 114, in which the blocking information tuples are derived from multiple pass scanning snapshots of the identified threads by the invoked system daemons or resources indicated above. In the particular exemplary configuration, the deadlock detector 122 retrieves thread status messages 114 via the agent interface from each of the threads 112-N.

In addition to the exemplary circular dependency between threads 1 and 2, additional circular dependencies may exist, and a particular thread may be included in different circular dependencies, depending on the resources sought. Accordingly, the deadlock detector performs a check, at step 308, to determine if there are more tuples of blocking threads 112, typically locks held by the thread 112 on the resource, as depicted at step 308. If there are more tuples to be gathered as entries 128-N in the thread dependency table 124, then control reverts to step 306, otherwise, the thread dependency table 124 is complete for the current detection interval.

Upon completion of gathering the set or tuples in an interval, the deadlock detector analyzes the thread dependency table 124, in which each entry 128-N corresponds to a gathered tuple indicative of a blocking dependency. Accordingly, the deadlock detector 122 analyzes, for each thread 112 for which a blocking dependency was found, multiple sets of blocking information tuples derived from scanning snapshots of the identified threads 112, as depicted at step 309. The deadlock detector 122 traverses the entries 128 to build a dependency chain, and when a circular dependency is found, as disclosed at step 310, the circular dependency is added to a set of identified circular dependencies 125 for ratification, as depicted at step 311.

For example, the thread dependency table 124 illustrates that thread 1 112-1 currently owns, or has a lock on, resource B, as indicated by arrow 150-1 and entry 128-2, indicating ownership 124-4 of object B 124-3 by thread owner 1. Similarly, entry 128-1 indicates ownership of object A 124-3 by thread 2 124-4, as indicated by arrow 150-2. Further, fields 124-1 and 124-2 indicate that thread 1 is blocked by the object A held by thread 2, as shown by arrow 150-3, and that thread 2 is blocked waiting for the object B held by thread 1, shown by arrow 150-4, thus indicating a circular dependency between threads 1 112-1 and 2 112-2.

During each iteration, a check is performed to determine if each of the threads, or tuples, indicated in the dependency table as potentially indicative of a circular dependency has been analyzed, and control reverts to step 306 to continue traversing the dependency table if there are more threads to analyze in the current interval, as indicated at step 312.

Following the analysis of the deadlock detection tuples, at step 312, a set of circular dependencies 125 is created for ratification. As indicated above, the circular dependencies 125 found are then ratified to confirm a deadlock condition. Since deadlock is characterized by none of the deadlocked threads 112 advancing, or executing instructions, advancement by one or more threads 112 indicates that a deadlock condition does not exist.

Accordingly, once the set of circular dependencies is compiled by the deadlock detector 122 based on the thread dependency table 124, the transition comparator 126 compares, if the analyzing indicates that an undesirable or circular dependency exists, a progression or transition indicator 124-5 indicative of advancement of the threads 112 corresponding to the circular dependency, as depicted at step 313. The comparison, therefore, ratifies a potential deadlock presented by the pending undesirable dependency, in which a lack of advancement by a potentially deadlocked thread 112 is indicative of ratifying the potential deadlock, as shown at step 314. The transition comparator 126 identifies progression of the threads 112-N in question by performing a successive snapshot to identify advancement of each the threads 112-N in question, as indicated by the circular dependency 125, as depicted at step 315.

The circular dependency 125, in a particular configuration, may include an ordered set of references to the dependency table 124 entries 128 defining the deadlock. Accordingly, deadlock ratification includes examining the transition field 124-5 of the entries 128 in the circular dependency on at least two occasions, such as consecutive deadlock scanning intervals. A variety of implementations will be apparent to those of skill in the art which are operable to identify incremental deltas exhibited by the transition field 124-5.

Therefore, advancement is indicated by a state transition of at least one of the threads 112 in the computed undesirable dependency 125 identified in the circular dependency 125 set, as depicted at step 316. Identifying such advancement includes, in the exemplary configuration, reading a transition register, or field 124-5 indicative of advancement of the progress indicator in the thread 112, in which the instruction counter advances according to a thread control flow when the thread is unblocked and stopped when the thread is waiting for a resource, as shown at step 317.

A check is performed to ascertain if any of the threads 112 in the identified circular dependency 125 have advanced, as expressed by a change of state reflected by the transition field 124-5, as depicted at step 318. If no advancement is indicated by any of the fields 124-5 of the corresponding thread entries 128, then deadlock is confirmed by ratification of the circular dependency, as depicted at step 319. Otherwise, additional circular dependencies are checked, as depicted at step 320, until no pending circular dependencies remain for ratification.

As indicated above, the circular dependency/ratification check depicted in steps 300-320 recurs according to a detection interval, queue depth, wait time, or other possible indication of a need to perform a deadlock check. Such an interval or condition is a system tuning parameter, and may vary. Typically, such an interval is a sufficiently brief time during which a deadlock may be permitted to occur without incurring irrecoverable results.

Those skilled in the art should readily appreciate that the programs and methods for controlling thread execution based on deadlock detection in an object based environment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for controlling thread execution in an object based environment has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computerized method for controlling execution in an object based environment comprising:
   identifying a plurality of threads having a potential demand for at least one of a plurality of shared resources;
   determining when multiple identified threads are waiting for at least one of the shared resources;
   enumerating, for each of the determined waiting threads, a lock holding entity (blocking entity) holding the shared resource sought by each of the waiting threads;
   computing whether an undesirable dependency exists by analyzing each of the blocking entities and corresponding waiting threads; and
   comparing, if the analyzing indicates that pending undesirable dependency exists, a progression indicator indicative of advancement of the threads corresponding to the undesirable dependency;
   wherein computing the pending undesirable dependency further comprises determining a circular dependency among a plurality of waiting threads, the circular dependency indicative of a thread waiting for a resource held by a lock holding entity and simultaneously holding a resource sought, directly or indirectly, by the same lock holding entity;
   wherein computing and comparing occur in a non-intrusive manner during continuous concurrent execution of the threads; and
   wherein enumerating further comprises:
      building a blocking information tuple indicative of an instance of a thread waiting for a resource;
      aggregating a plurality of blocking information tuples indicative of a plurality of threads and corresponding blocking entities; and
   wherein comparing and computing further comprises analyzing multiple sets of the blocking information tuples, the blocking information tuples derived from multiple pass scanning snapshots of the identified threads.

2. The method of claim 1 wherein comparing further comprises ratifying a potential deadlock presented by the pending undesirable dependency, wherein a lack of advancement by a potentially deadlocked thread is indicative of ratifying the potential deadlock.

3. The method of claim 2 wherein ratifying further comprises identifying progression of the threads in question by performing a successive snapshot to identify advancement of the threads in question.

4. The method of claim 3 wherein advancement is indicated by a state transition of at least one of the threads in the computed undesirable dependency.

5. The method of claim 4 further comprising reading a transition register indicative of advancement of an instruction counter in the thread, the instruction counter advancing according to a thread control flow when the thread is unblocked and stopped when the thread is waiting for a resource.

6. A computing device for detecting deadlock between concurrent threads in a multiprogramming environment comprising:
   a processor operable for performing:
      a deadlock detector operable to identify a plurality of threads having a potential demand for at least one of a plurality of shared resources;
      an agent interface operable for receiving messages for determining when multiple identified threads are waiting for at least one of the shared resources;
      a thread dependency table operable to enumerate, for each of the determined waiting threads, a lock holding entity (blocking entity) holding the shared resource sought by each of the waiting threads, the deadlock detector further operable to employ the thread dependency table to computer whether an undesirable dependency exists by analyzing each of the blocking entities and corresponding waiting threads; and a transition comparator operable to compare, if the analyzing indicates that an undesirable dependency exists, a progression indicator indicative of advancement of the threads corresponding to the undesirable dependency;

wherein the deadlock detector is further operable to compute the undesirable dependency by:

determining a circular dependency among a plurality of waiting threads, the circular dependency indicative of a thread waiting for a resource held by a lock holding entity; and simultaneously holding a resource sought, directly or indirectly, by the same lock holding entity; and simultaneously holding a resource sought, directly or indirectly, by the same lock holding entity;

wherein the deadlock detector is operable to perform computing and comparing in a non-intrusive manner during continuous concurrent execution of the threads;

wherein the deadlock detector is further operable to:

build a blocking information tuple indicative of an instance of a thread waiting for a resource; and aggregate a plurality of blocking information tuples indicative of a plurality of threads and corresponding blocking entities; and wherein the deadlock detector is further operable to perform the comparing and computing by analyzing multiple sets of the blocking information tuples, the blocking information tuples derived from multiple pass scanning snapshots of the identified threads.

7. The computing device of claim 6 wherein the transition comparator is operable to ratify a potential deadlock presented by the pending undesirable dependency, wherein a lack of advancement by a potentially deadlocked thread is indicative of ratifying the potential deadlock.

8. The computing device of claim 7 wherein the transition comparator is further operable to identify progression of the threads in question by performing a successive snapshot to identify advancement of the threads in question.

9. The computing device of claim 8 wherein the transition comparator is operable to determine a state transition of at least one of the threads in the computed undesirable dependency.

10. The computing device of claim 9 wherein the transition counter is further operable to read a transition register indicative of advancement of an instruction counter in the thread, the instruction counter advancing according to a thread control flow when the thread is unblocked and stopped when the thread is waiting for a resource.

11. A computer program product having a computer readable medium operable to store computer program logic embodied in computer program code encoded thereon when executed by a processor operable for controlling execution in an object based environment comprising:

computer program code for identifying a plurality of threads having a potential demand for at least one of a plurality of shared resources;

computer program code for determining when multiple identified threads are waiting for at least one of the shared resources;

computer program code for enumerating, for each of the determined waiting threads, a lock holding entity (blocking entity) holding the shared resource sought by each of the waiting threads;

computer program code for computing whether an undesirable dependency exists by analyzing each of the blocking entities and corresponding waiting threads; and computer program code for comparing, if the analyzing indicates that a pending undesirable dependency exists, a progression indicator indicative of advancement of the threads corresponding to the undesirable dependency;

wherein the computer program code for computing the pending undesirable dependency further comprises computer program code for determining a circular dependency among a plurality of waiting threads, the circular dependency indicative of a thread waiting for a resource held by a lock holding entity and simultaneously holding a resource sought, directly or indirectly, by the same lock holding entity;

wherein computing and comparing occur in a non-intrusive manner during continuous concurrent execution of the threads; and wherein the computer program code for enumerating further comprises:

computer program code for building a blocking information tuple indicative of an instance of a thread waiting for a resource;

computer program code for aggregating a plurality of blocking information tuples indicative of a plurality of threads and corresponding blocking entities; and wherein the computer program code for comparing and computing further comprises computer program code for analyzing multiple sets of the blocking information tuples, the blocking information tuples derived from multiple pass scanning snapshots of the identified threads.

12. A system for detecting deadlock between concurrent threads in a multiprogramming environment comprising a processor operable for performing:

means for identifying a plurality of threads having a potential demand for at least one of a plurality of shared resources;

means for determining when multiple identified threads are waiting for at least one of the shared resources;

means for enumerating, for each of the determined waiting threads, a lock holding entity (blocking entity) holding the shared resource sought by each of the waiting threads;

means for computing whether an undesirable dependency exists by analyzing each of the blocking entities and corresponding waiting threads; and means for comparing, if the analyzing indicates that a pending undesirable dependency exists, a progression indicator indicative of advancement of the threads corresponding to the undesirable dependency;

wherein the means for computing the pending undesirable dependency further comprises means for determining a circular dependency among a plurality of waiting threads, the circular dependency indicative of a thread waiting for a resource held by a lock holding entity and simultaneously holding a resource sought, directly or indirectly, by the same lock holding entity;

wherein computing and comparing occur in a non-intrusive manner during continuous concurrent execution of the threads; and wherein the means for enumerating further comprises:

means for building a blocking information tuple indicative of an instance of a thread waiting for a resource;

means for aggregating a plurality of blocking information tuples indicative of a plurality of threads and corresponding blocking entities; and wherein the means for comparing and computing further comprises means for analyzing multiple sets of the blocking information tuples, the blocking information tuples derived from multiple pass scanning snapshots of the identified threads.

* * * * *